July 25, 1933.  H. M. JENSEN ET AL  1,919,222
NAVIGATIONAL INSTRUMENT
Filed Jan. 3, 1933  2 Sheets-Sheet 1

INVENTORS
HENRY M. JENSEN
JOHN E. GINGRICH
BY GUILLERMO MEDINA
ATTORNEY

July 25, 1933.   H. M. JENSEN ET AL   1,919,222
NAVIGATIONAL INSTRUMENT
Filed Jan. 3, 1933    2 Sheets-Sheet 2

INVENTORS
HENRY M. JENSEN
JOHN E. GINGRICH
BY GUILLERMO MEDINA
ATTORNEY

UNITED STATES PATENT OFFICE

HENRY M. JENSEN AND JOHN E. GINGRICH, OF THE UNITED STATES NAVY, AND GUILLERMO MEDINA, OF WASHINGTON, DISTRICT OF COLUMBIA

NAVIGATIONAL INSTRUMENT

Application filed January 3, 1933. Serial No. 649,958.

(GRANTED UNDER THE ACT OF MARCH 3, 1883, AS AMENDED APRIL 30, 1928; 370 O. G. 757)

This invention relates to navigational instruments, and more particularly to an instrument for converting civil time into sidereal time.

Applicants are aware that instruments have previously been constructed for this purpose but all such prior instruments of which applicants have knowledge employ three scales, a date scale, a civil time scale and a sidereal time scale, together with a pointer or arm adapted to move over these scales. Applicants, by a novel arrangement, have made it possible to use one hour scale for indicating both the civil and the sidereal times, and also to have the pointer fixed instead of movable. This reduces the number of adjustments to be made to one and does away with a movable pointer that is apt not only to slip but also to catch on the papers and charts that are usually spread out on the navigator's table.

In the form in which the invention is herein disclosed it is shown as being especially adapted to the star finder and identifier disclosed in United States Letters Patent No. 1,401,446. It will be noted that, as described on page 3, lines 9 to 18 of said patent, that the local sidereal time of observation must be determined before the star finder can be used. The present invention when incorporated in the star finder permits the quick determination of the local sidereal time without reference to other books or instruments, and the fixed arm that is possible with this invention reduces interference with the templets which the use of the instrument requires to be adjusted on the surface thereof, as explained in the patent referred to.

The apparatus of this invention consists essentially of a rotatable disk or ring that is pivoted at the center of a base or framework. The outer circumference of the disk or ring is divided into an hour scale marked from 0 to 24 hours with subdivisions for smaller increments of time. The base or framework extends beyond the edge of the disk and has marked thereon, at a radius sufficient to show just outside the rotatable disk or ring, graduations so spaced that the angular change between successive divisions or units is equal to the angular change in the difference between sidereal time and civil time in 24 hours. This results in the complete circle of 360° being divided into 365 divisions plus a smaller division or space equal to the difference between the time interval of 365 civil days and 366 sidereal days. In other words, this circle is divided into approximately 365¼ equal parts, and the divisions of this scale are marked according to the calendar dates from 1 January to 31 December. The extra ¼ space is placed between 31 December and 1 January so that that space is approximately ¾ the size of the other spaces.

In the construction of the instrument advantage is taken of the fact that sidereal time and civil time at Greenwich, or any other place on the earth, are the same on September 21 and thus the arm or pointer, instead of being movable, is semi-permanently fixed at that point, being capable of sufficient adjustment annually to take care of the difference between 365 civil days and 366 sidereal days, which adjustments go through a cycle every four years, as will be explained more fully hereinafter. This arrangement makes possible the use of the hour scale both for civil time and for sidereal time and thus eliminates an hour scale.

The objects of this invention are first to provide an instrument which by two scales, a date scale and an hour scale, and a fixed pointer is capable of converting civil time into sidereal time.

A further object is the adaptation of this invention to the star finder described in United States Patent No. 1,401,446.

With the above and other objects in view, this invention consists of such construction and arrangement of parts as will be more fully described hereinafter in connection with the accompanying drawings, in which.

Figure 1:
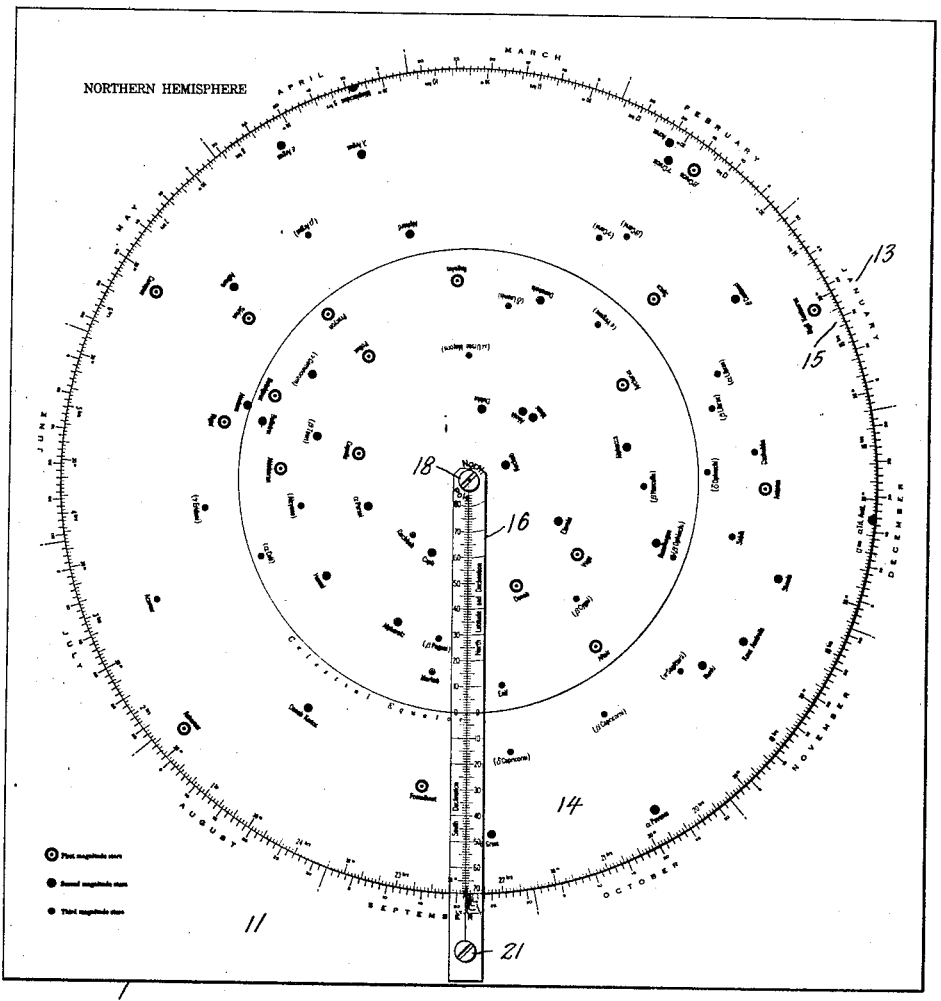
Fig. 1 is a plan view of the instrument for use when in the northern hemisphere.
Figure 2:
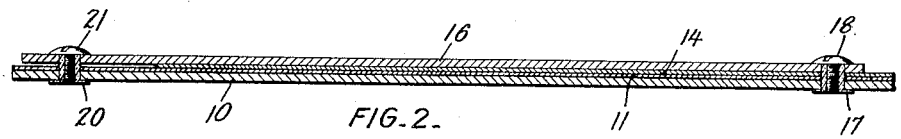
Fig. 2 is a section through a portion of the instrument and the arm or pointer.
Figure 3:
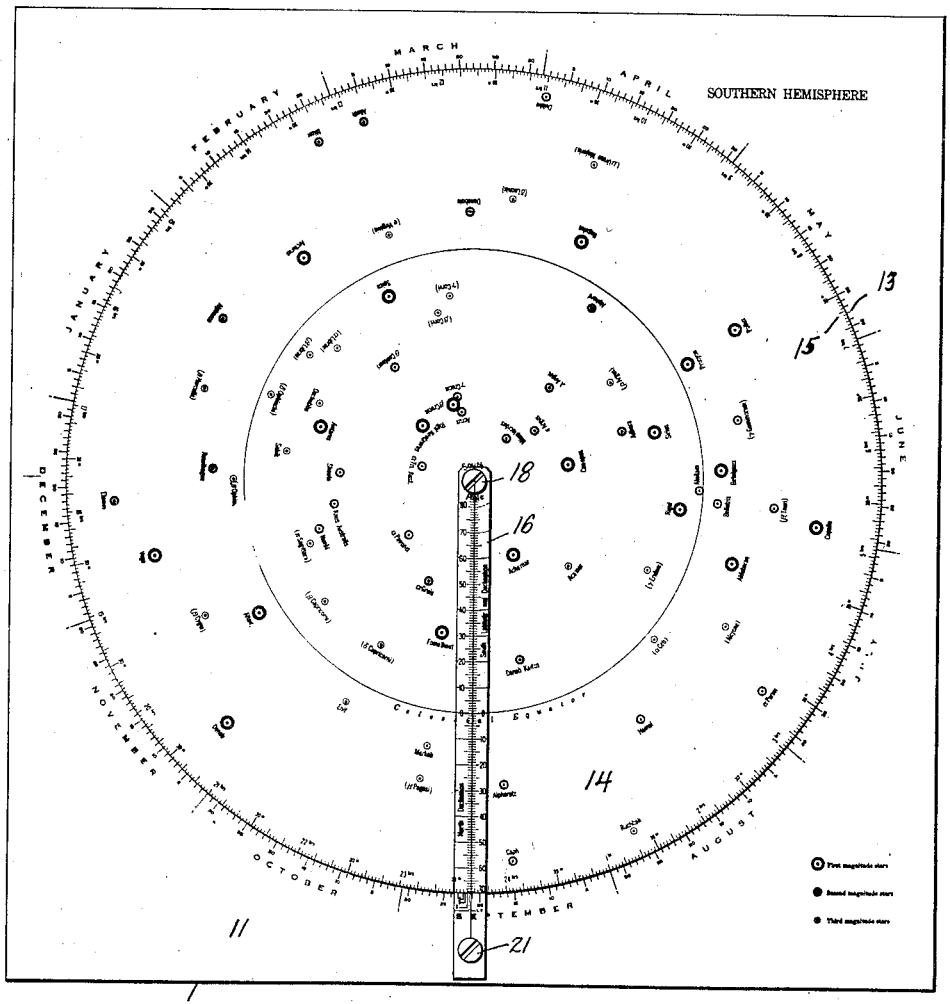
Fig. 3 is a plan view of the instrument for use when in the southern hemisphere.
Figure 4:
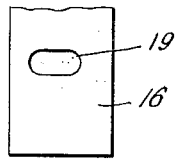
Fig. 4 is an enlarged view of the end of the arm or pointer.

In the form shown, the framework 10 is made of heavy cardboard and has glued or otherwise secured to it a piece of heavy paper 11, such as chart paper, upon which is marked the date scale 13. This scale advances counterclockwise in the northern hemisphere and clockwise in the southern hemisphere. Pivoted at the center of the date scale is a disk 14 of heavy paper which has marked on the outer circumference thereof an hour scale 15, from 0 to 24 hours. This scale advances clockwise in the northern hemisphere and counterclockwise in the southern hemisphere. The radius of the disk is such that it overlaps the edge of but does not cover the date scale. This facilitates the adjustment of any particular point on the hour scale to a particular point on the date scale. Also, pivoted at the center of the date scale and the disk is an arm 16 made of transparent material and graduated in degrees to represent both declination and latitude. For the northern hemisphere the graduations are marked from the celestial equator towards the pivot from 0 to 85° north and from the celestial equator away from the pivot from 0 to 70° south and conversely for the southern hemisphere. The disk 14 and arm 16 are pivoted on a hollow, internally threaded rivet 17 into which is screwed a flat headed screw 18. The outer end of the arm 16 has an elongated opening 19 through which passes a rivet 20 and screw 21, similar to those described above, which are for the purpose of securing the arm in a desired position. The elongation of the slot permits the adjustments that are required.

On the disks 14 for both hemispheres, the corresponding navigational stars are located in accordance with their respective right ascensions as indicated on the hour scales 15 and their respective declinations as indicated on the arms 16. The magnitudes of the various stars are indicated by their sizes. Also, for convenience in estimating the approximate declinations of stars, a circle corresponding to the celestial equator is printed on each disk.

As explained before, the date scale is divided into 365¼ equal parts, 1¼ parts being between December 31 and January 1. Now let us consider the first year after leap year. Place 24 hours of the hour scale, which is also zero hours, exactly on the date mark for January 1, and draw a mark on the paper 11 outside the disk, opposite the sidereal hour, on the disk, corresponding to that civil date and hour as given by the nautical almanac. This mark will be somewhere on September 21 of the date scale since civil time and sidereal time are the same once each year at some time on September 21 or 22. That is, on September 21 there occurs a time when the civil time is such that when set opposite the date scale it must be set exactly under the center line of the arm, then, since this line also points out on the same hour scale, the corresponding sidereal time, it must be the same as the civil time. This mark is labeled "1" to represent the first year after leap year. The arm is clamped with its center line over this mark and this setting is correct for the entire year. To obtain the sidereal time at any date and hour throughout the year, it is then necessary simply to set the civil hour to the point of the date scale corresponding to the civil date and fraction of a day as represented by the civil time, and the sidereal time may be read from the hour scale of the disk under the center line of the arm or pointer.

The space between December 31 and January 1 is approximately ¾ the size of the other spaces and hence when January 1 of the second year after leap year arrives, in order to compensate for this extra ¼ space of advance, the arm must be advanced a corresponding amount to the mark labeled "2". The exact position for this mark can be determined in the same manner as described for locating the mark "1". The arm is clamped in this position which setting is correct for the entire second year after a leap year.

A similar advance must be made on January 1 of the third year after leap year to the mark labeled "3" and this setting is likewise correct for the entire year.

A similar advance must be made on January 1 of the leap year, but the setting on this mark labeled "4" is correct only until March 1. The reason for this is that the date graduation of March 1 is used for February 29 of the leap year and also for March 1. Hence, when using it for March 1, it is equivalent to retarding the date scale one day, and to compensate for this the arm must likewise be retarded a similar amount to the mark labeled "L.Y." and this setting is then correct for the remainder of the year.

On January 1 following the leap year, the arm is again set to the mark labeled "1" and the same cycle is then gone through to the next leap year, and so on throughout every four years from leap year to leap year.

The particular advantage of this invention when incorporated in the Star Finder may now be seen by referring to Patent No. 1,401,446, where it will be noted that a movable pointer is necessary and the L.S.T. must be calculated separately. The present invention determines the L.S.T. by a fixed pointer which also acts as the meridian upon which the templets are adjusted with their center at the latitude of the observer as indicated on the arm, and the center line of the arm coinciding with the meridian on the templet. It is evident that during such sliding around of the templet over the arm, a movable arm is very apt to get out of adjustment and hence a fixed arm would be far superior. Thus, the unique and ingenious feature of this invention facilitates and renders more accurate the daily work of the navigator at sea.

It will be understood that the above description and accompanying drawings comprehend only the general and preferred embodiments of our invention and that various changes may be made therein within the scope of the appended claims without sacrificing any of the advantages of this invention.

The invention described herein may be manufactured and used by or for the Government of the United States of America for governmental purposes without the payment of any royalty thereon.

We claim:

1. A navigational instrument, comprising a base upon which is graduated a date scale, a disk pivoted at the center of said date scale and having graduated on its edge an hour scale, said hour scale being associated with said date scale to facilitate the adjustment of one in relation to the other, said disk having located thereon the celestial navigational bodies in their true correlative positions the polar zenith and the celestial equator, and a semi-permanently fixed arm pivoted at said polar zenith and extending beyond the edge of said disk, said arm having a median line for indicating on said hour scale the corresponding sidereal time for any particular adjustment of the hour scale in relation to the date scale, said arm also having graduations thereon for indicating both the latitude of the observer and the declinations of the celestial bodies.

2. A navigational instrument, comprising a base upon which is graduated a circular date scale divided approximately into 365¼ equal parts, a disk pivoted at the center of said date scale and having graduated on its edge an hour scale, said hour scale being associated with said date scale to facilitate the adjustment of one in relation to the other, said disk having located thereon the celestial navigational bodies in their true correlative positions, and a semi-permanently fixed arm pivoted at the center of said disk and extending beyond its edge, said arm having graduations thereon for indicating both the latitude of the observer and the declinations of the celestial bodies.

3. A navigational instrument, comprising a framework upon which is graduated a date scale, circular means pivoted at the center of said date scale and having graduated adjacent the edge of said means an hour scale, said hour scale being associated with said date scale to facilitate the adjustment of one in relation to the other, and a semi-permanently fixed arm pivoted at the center of said means and extending beyond its edge for indicating on said hour scale the corresponding sidereal time for any particular adjustment of the hour scale in relation to the date scale, said arm being sufficiently adjustable to permit the changes necessary over a cycle of four years.

4. A navigational instrument, comprising a framework upon which is graduated a date scale, circular means pivoted at the center of said date scale and having graduated adjacent the edge of said means an hour scale, said hour scale being associated with said date scale to facilitate the adjustment of one in relation to the other, and a fixed arm extending from the center of said means to beyond its edge for indicating on said hour scale the corresponding sidereal time for any particular adjustment of the hour scale in relation to the date scale.

5. A navigational instrument, comprising a base upon which is graduated a date scale, circular means pivoted at the center of said date scale and having graduated on the edge of said means an hour scale, said hour scale being associated with said date scale to facilitate the adjustment of one in relation to the other, and a group of marks on said base as disclosed and described in the specification each mark for use over a definite period to indicate on said hour scale the corresponding sidereal time for any particular adjustment of the hour scale in relation to the date scale.

6. A navigational instrument, comprising a framework upon which is graduated a circular date scale, circular means pivoted at the center of said date scale and having graduated on the edge of said means an hour scale, said hour scale being associated with said date scale to facilitate the adjustment of one in relation to the other, and a mark on said framework to indicate on said hour scale the corresponding sidereal time for any particular adjustment of the hour scale in relation to the date scale.

HENRY M. JENSEN.
JOHN E. GINGRICH.
GUILLERMO MEDINA.